US012589343B1

(12) United States Patent
Vandervorst et al.

(10) Patent No.: US 12,589,343 B1
(45) Date of Patent: Mar. 31, 2026

(54) REUSABLE AIR FILTER ASSEMBLY

(71) Applicants: Jeremiah Vandervorst, Sioux Falls, SD (US); Angelica Vandervorst, Sioux Falls, SD (US)

(72) Inventors: Jeremiah Vandervorst, Sioux Falls, SD (US); Angelica Vandervorst, Sioux Falls, SD (US)

( * ) Notice: Subject to any disclaimer, the term of this patent is extended or adjusted under 35 U.S.C. 154(b) by 0 days.

(21) Appl. No.: 19/216,355

(22) Filed: May 22, 2025

(51) Int. Cl.
| | |
|---|---|
| *B01D 53/02* | (2006.01) |
| *B01D 46/00* | (2022.01) |
| *B01D 46/02* | (2006.01) |

(52) U.S. Cl.
CPC ......... *B01D 46/0005* (2013.01); *B01D 46/02* (2013.01); *B01D 2265/06* (2013.01)

(58) Field of Classification Search
CPC . B01D 46/0005; B01D 46/02; B01D 2265/06
See application file for complete search history.

(56) References Cited

U.S. PATENT DOCUMENTS

| | | | | |
|---|---|---|---|---|
| 2,693,246 | A | 11/1954 | Marcheck | |
| 2,992,958 | A | 7/1961 | Yamaguchi | |
| 3,765,152 | A * | 10/1973 | Pausch | B01D 46/4281 |
| | | | | 95/279 |
| 4,080,185 | A * | 3/1978 | Richter | B01D 46/023 |
| | | | | 55/483 |
| 4,195,050 | A * | 3/1980 | Walther | B01D 46/10 |
| | | | | 264/261 |
| 6,692,637 | B2 * | 2/2004 | Fox | A01K 63/045 |
| | | | | 210/489 |
| 6,740,137 | B2 | 5/2004 | Kubokawa | |
| 7,150,774 | B2 | 12/2006 | Kubokawa | |
| 8,702,829 | B2 | 4/2014 | Lise | |
| 9,623,355 | B2 * | 4/2017 | Caesar | B01D 46/0049 |
| 10,835,851 | B2 * | 11/2020 | Parvin | B01D 46/0002 |
| 11,648,498 | B2 | 5/2023 | Bland | |
| 2015/0174518 | A1 * | 6/2015 | Caesar | B01D 46/0049 |
| | | | | 55/341.2 |
| 2015/0265959 | A1 * | 9/2015 | Crabtree | A01K 1/0064 |
| | | | | 55/482 |
| 2023/0089672 | A1 * | 3/2023 | Mok | B01D 46/10 |
| | | | | 55/497 |

* cited by examiner

*Primary Examiner* — Christopher P Jones
(74) *Attorney, Agent, or Firm* — Jeffrey A. Proehl; Woods, Fuller, Shultz & Smith, PC

(57) ABSTRACT

A reusable filter assembly which may comprise a support frame and a filter media envelope removably positionable on the support frame. The filter media envelope defines an interior and has an opening into the interior and through which the support frame is insertable into and removable from the interior. The filter media envelope may form a major pocket for removably receiving a major portion of the support frame and a minor pocket for receiving a minor portion of the support frame when the support frame is positioned in the interior of the filter media envelope. The minor pocket may be oriented in opposition to the major pocket such that portions of the frame are positionable in the major and minor pockets simultaneously.

9 Claims, 5 Drawing Sheets

REUSABLE AIR FILTER ASSEMBLY

BACKGROUND

Field

The present disclosure relates to air filters and more particularly pertains to a new reusable air filter assembly which may be easily disassembled for cleaning and reassembled for reuse.

Description of the Prior Art

The use of air filters for air handling equipment, such as furnaces and air conditioners, is known, and the air filters tend to have relatively thin, broad shapes for inserting into and extending across the air path in the air handling equipment. While the most common forms of air filters are intended to be for a single use and discardable after that use, various known air filter designs have been intended to be reusable by virtue of being cleanable by, for example, by removal of the air filter media from a supportive frame, washing of the filter media, and reinstallation of the filter media, supportive frame.

SUMMARY

Some aspects, the present disclosure relates to a reusable filter assembly which may comprise a support frame and a filter media envelope removably positionable on the support frame. The filter media envelope defines an interior and has an opening into the interior and through which the support frame is insertable into and removable from the interior. The filter media envelope may form a major pocket for removably receiving a major portion of the support frame and a minor pocket for receiving a minor portion of the support frame when the support frame is positioned in the interior of the filter media envelope. The minor pocket may be oriented in opposition to the major pocket such that portions of the frame are positionable in the major and minor pockets simultaneously.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
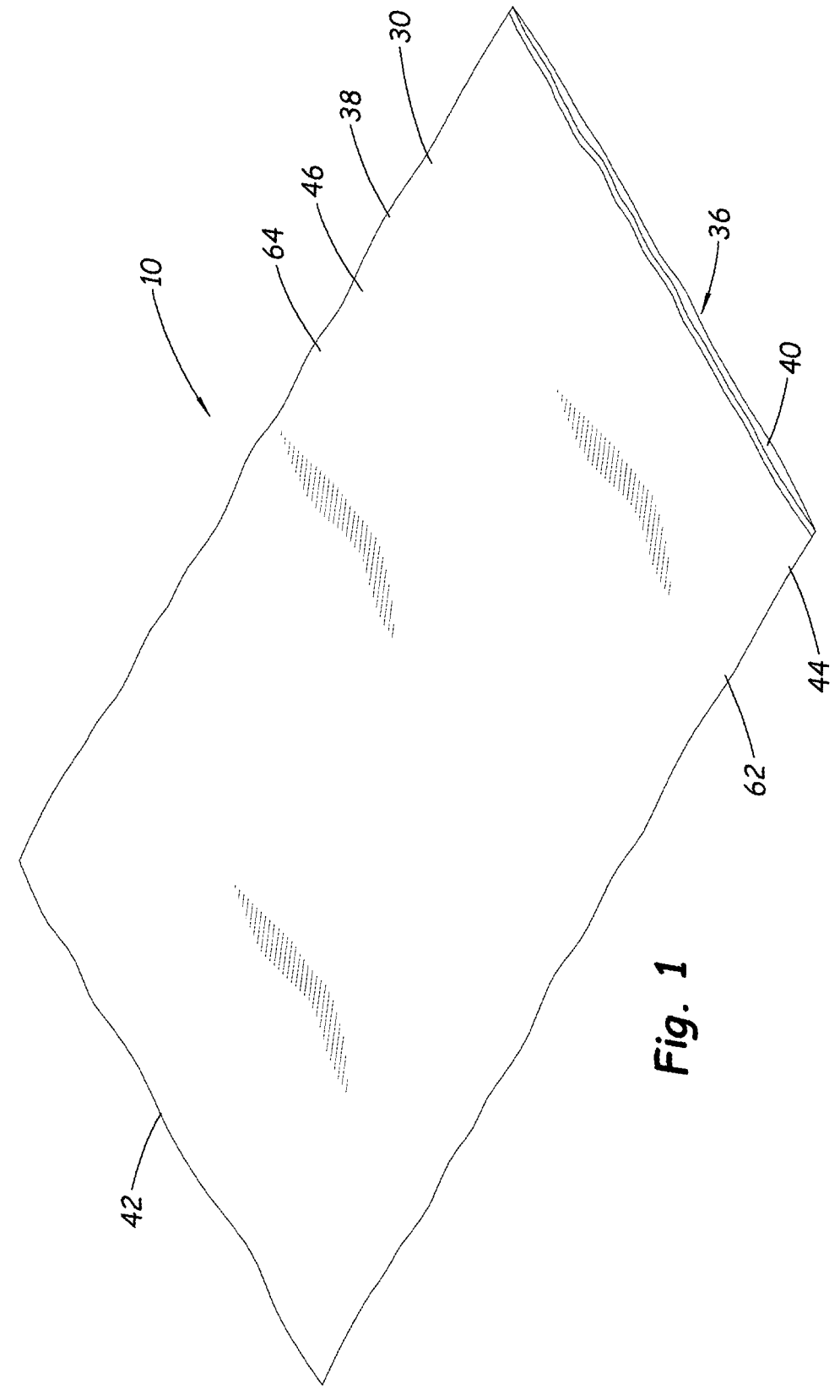
FIG. 1 is a schematic perspective view of a new reusable air filter assembly according to the present disclosure.
Figure 2:
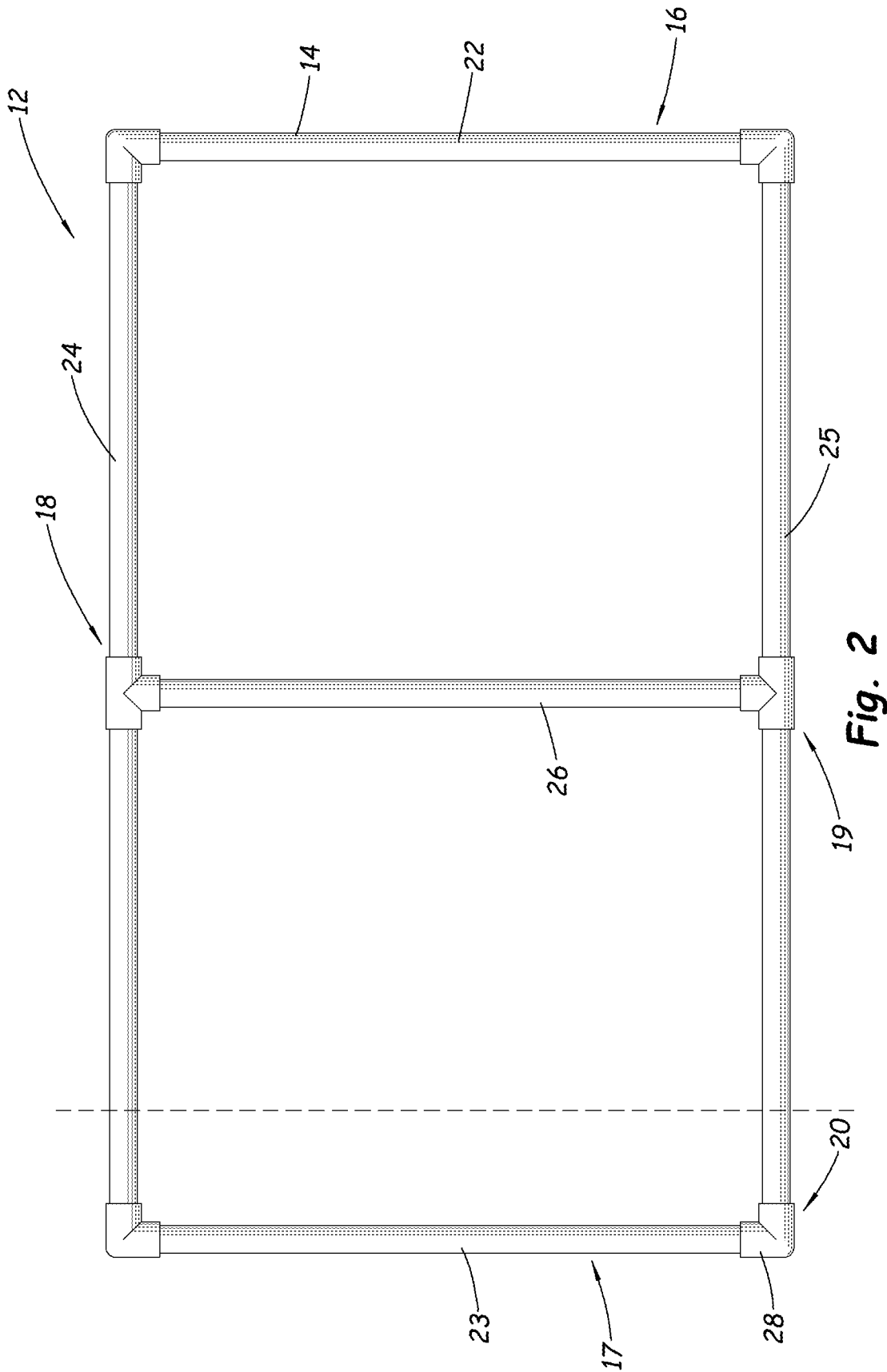
FIG. 2 is a schematic top view of the filter assembly with the filter media envelope removed to show detail of the support frame, according to an illustrative embodiment.
Figure 3:
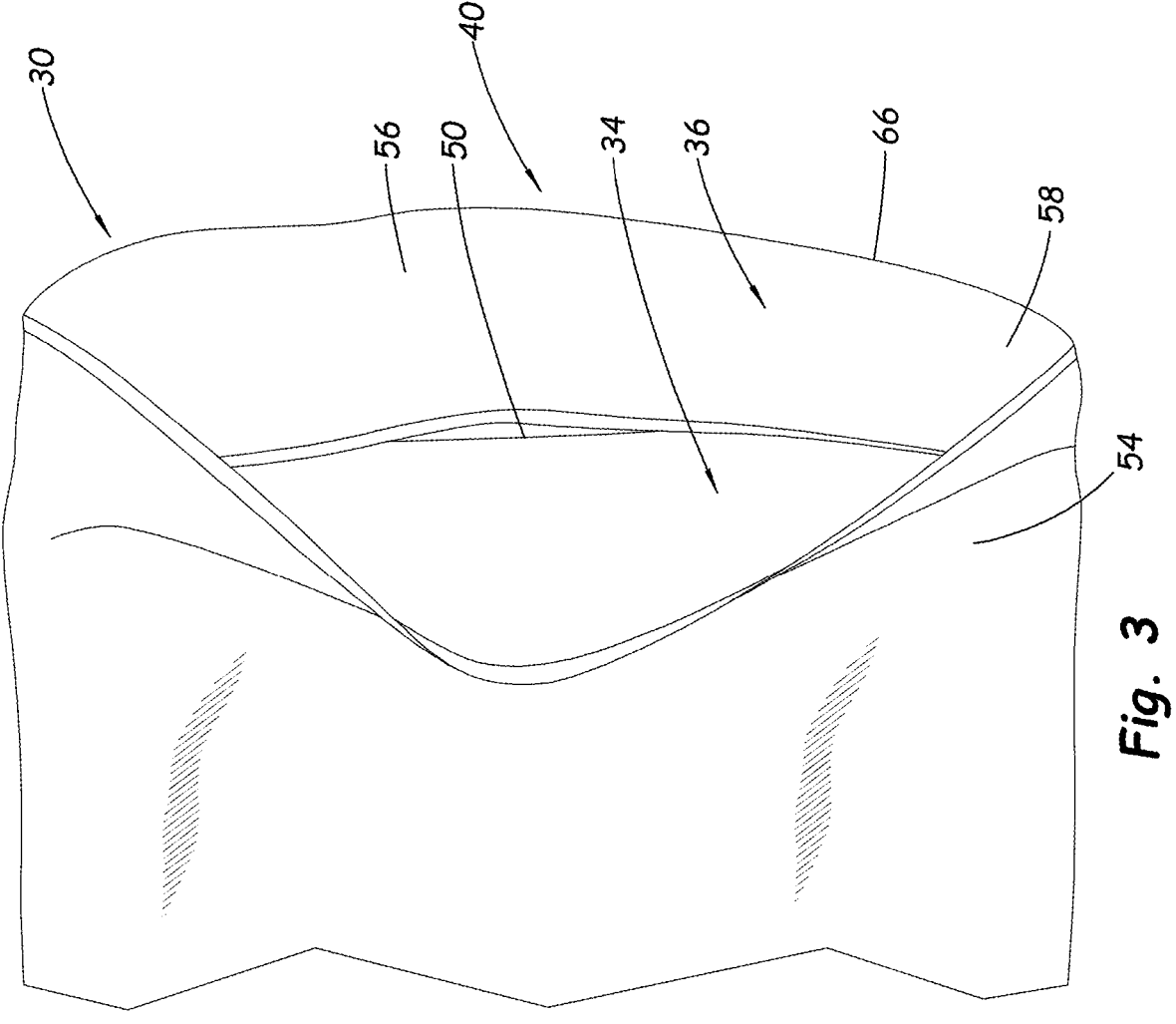
FIG. 3 is a schematic top view of the filter media envelope with a portion of the second broad extent of the envelope drawn back to expose a portion of the interior of the envelope and the pocket extent of the filter media, according to an illustrative embodiment.
Figure 4:
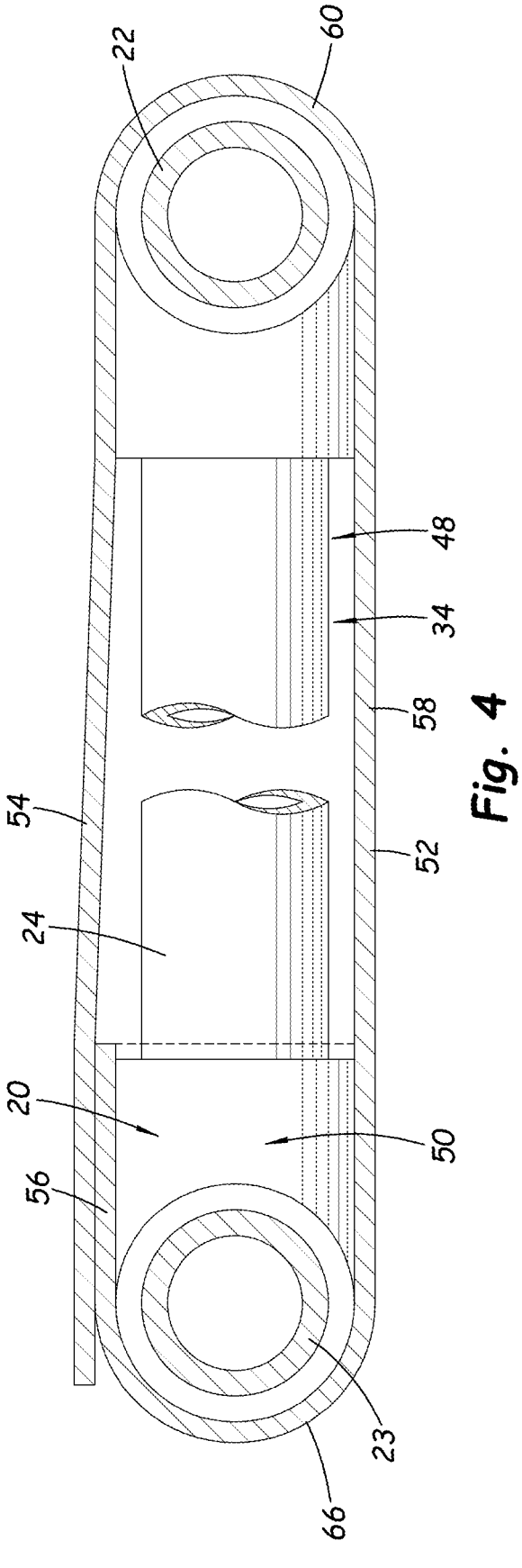
FIG. 4 is a schematic sectional view of the air filter assembly taken along a longitudinal section line according to an illustrative embodiment.
Figure 5:
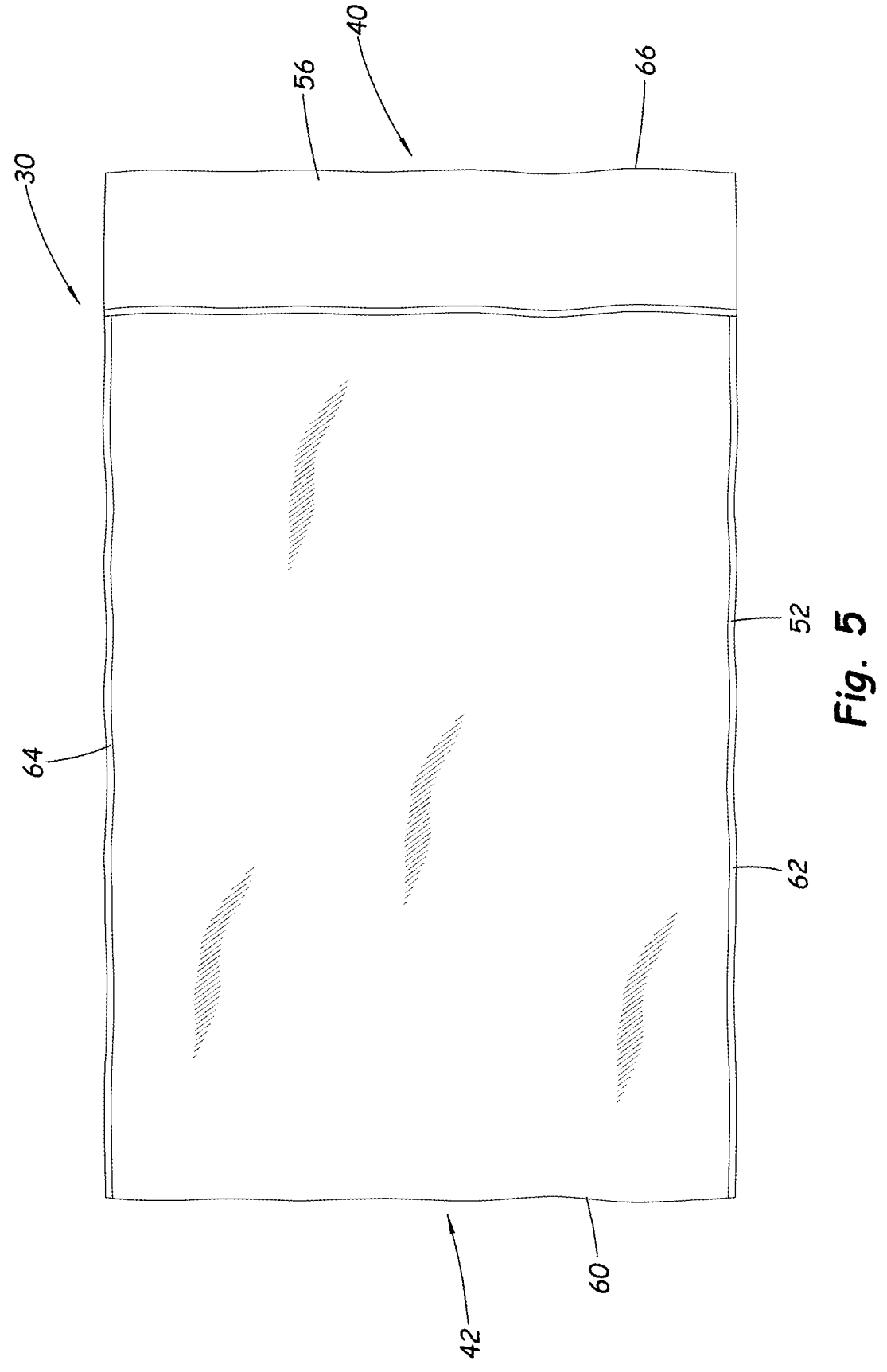
FIG. 5 is a schematic top view of the filter media envelope turned inside out into an inverted condition, according to an illustrative embodiment.

With reference now to the drawings, and in particular to FIGS. 1 through 5 thereof, a new reusable air filter assembly embodying the principles and concepts of the disclosed subject matter will be described.

The applicants have recognized that the value of known designs for reusable air filters for air handling equipment has been diminished by a number of drawbacks to the designs making the designs more complicated than necessary, and therefore making the costs of air filters constructed to those designs more expensive and difficult to use than is truly necessary.

The applicants have recognized that the closure devices utilized in many of the prior reusable air filter designs add unnecessary cost by virtue of the initial cost of the closure device, the cost of executing specialized steps to install the closure device on the filter media, and the loss of the air filter when the closure device fails yet the filter media itself remains usable. As an example, the utilization of zippers on the filter media adds the cost of the zipper to the overall cost of the air filter, requires extra steps to attach (e.g., sew, weld, etc.) the zipper to the filter, and failure of the zipper renders the filter unable to be reused again. Often the zipper is positioned along an edge of the filter to be positioned alongside a member of the supportive frame, and as a result, the zipper is not only stressed during installation of the filter on the supportive frame, but is also under constant tension applied by the stretched filter media, particularly when air airflow is applied to the filter media and the resulting pressure pushes against the filter media.

The applicants have discovered a design for filter media that avoids the use of closure devices such as zippers, yet is able to securely mount the filter media to the supportive frame over multiple repeated removals and reinstallations of the filter media on the supportive frame.

Aspects of the disclosure relates to a reusable filter assembly 10 that generally includes a filter media envelope 30 and a support frame 12 on which the envelope is removably and replaceably mounted.

In greater detail, embodiments of the support frame 12 may define a perimeter 14 which may be rectangular in shape in embodiments. The illustrative embodiments of the support frame have opposite end segments 16, 17 and opposite side segments 18, 19. It should be recognized that the use of the terms "side" and "end" in this description are not intended to require any specific size relationship between the sides and end, as the sides and ends may have similar sizes or different sizes. The support frame 12 may also have a tuck section 20 which includes one of the aforementioned segments 16, 17, 18, 19 of the perimeter and portions of the segments adjacent to that segment.

In the illustrative embodiments, the support frame 12 may have a substantially open center area or space and may comprise a pair of opposite end members 22, 23 that form the end segments 16, 17 of the perimeter and a pair of opposite side members 24, 25 that form the side segments 18, 19 of the perimeter of the support frame 30. Also, the support frame 12 may comprise one or more intermediate cross members 26 extending between the opposite side members, in a substantially parallel orientation to the end members to provider additional structural support. The side and end members may be connected together at their respective ends in any suitable manner to secure them to each other. In some embodiments, the side and end members may be secured together using suitable connectors 28 that joint the members to be connected together, and the connectors may receive ends of the members into sockets oriented at perpendicular or parallel orientations. The members may be secured to the connectors 28 in any suitable manner such as friction fit, gluing or bonding, or interlock utilizing, for example, threads or pins and slots. Disassembly of the members of the frame 12 from each other is not typically desired, but may be possible as an option.

The filter media envelope 30 may be removably positionable on the support frame 12, and the envelope 30 may define an interior 34 into which the frame 12 is introduced into and removed from. The media envelope 30 may have a mounted condition in which the frame 12 is positioned in the interior 34, and a dismounted condition in which the frame 12 is removed from the interior. The envelope 30 has an opening 36 through which the support frame 12 is insertable into, and removable from, the interior 34. The media envelope 30 has a periphery 38. The opening 36 may be positioned along a portion of the periphery 38. The periphery 38 may include an opening end portion 40 and a closed end portion 42 with the opening end portion being located opposite of the closed end portion. The periphery 38 may also include side portions 44, 46 that extend between the end portions 40, 42.

The filter media envelope 30 may form a major pocket 48 for receiving the support frame for use of the filter assembly 10, and also removal for cleaning of the media and/or replacement of worn or damaged media. The major pocket 48 may receive a major portion of the support frame, and the major pocket may receive an entirety of the support frame. In some suitable embodiments, the interior dimensions of the major pocket 48 are selected such that the filter media of the envelope 30 is stretched to a degree that the envelope fits snugly over the frame 12 without excessive tension In addition to the major pocket 48, the filter media envelope may form a minor pocket 50 for receiving a minor portion of the frame 12, such as the tuck section 20 of the support frame when the support frame is positioned in the major pocket 48. Each of the major and minor pockets may be bounded on three sides by, for example, a fold in the panel of filter media or by a permanent (or semipermanent) joining of edges of the panel of the filter media. Each of the major and minor pockets may have an opening on the fourth side of the pocket which is sized to receive a section of the support frame. The opening 36 of the filter media envelope may form the opening of the major pocket, while the opening of the minor pocket may be positioned in the interior 34 of the envelope.

The minor pocket 50 may be oriented or directed in opposition to the major pocket 48 such that the frame 12 may be received in both the major and minor pockets substantially simultaneously when the filter media envelope 30 is in the mounted condition on the frame, and such that the frame is effectively trapped and retained in the interior 34 between the major and minor pockets. Thus, the relationship between the major and minor pockets may retain the filter media envelope 30 securely on the support frame 12 without the use of any closure device or equivalent element. The minor pocket 50 may be located at the opening 36 and may extend alongside the opening. The minor pocket 50 may be located at least partially in the major pocket 48, such as toward or at the opening 36, and in some embodiments may be entirely or wholly located within the major pocket.

The major 48 and minor 50 pockets each have lengths measured in a direction perpendicular to the opening 36 of the filter media envelope. In the illustrative embodiments, the magnitude of the length of the major pocket 48 is larger than the magnitude of the length of the minor pocket. In embodiments, the magnitude of the length of the major pocket 48 is more than twice the magnitude of the length of the minor pocket 50, and the major pocket length may be 3, 4, or 5 times the minor pocket length. In some embodiments, the major pocket length is in the range of approximately 8 to approximately 12 times the minor pocket length, and in an illustrative embodiment the major pocket length is approximately 10 times the minor pocket length. As an example, in an embodiment in which the length of the major pocket 48 is approximately 25 inches (approximately 64 cm), the length of the minor pocket may be approximately 3 inches (approximately 7.5 cm).

In embodiments, the filter media envelope 30 may comprise a first broad extent 52 and a second broad extent 54, and the first and second broad extents may converge at the periphery 38 to form the major pocket 48. The minor pocket 50 may be formed in part by a pocket extent 56 of the single panel of filter media, which may extend from the first broad extent 52. The second broad extent 54 may overlap the pocket extent 56 of the single panel In some preferred embodiments, the filter media envelope 30 may be formed by a single panel or piece of filter media 58. The single panel may be elongated in shape and may be folded at a first fold 60 located at the closed end portion 42 of the periphery to form the first 52 and second 54 broad extents on opposite sides of the fold 60 such that each of the extents 52, 54 extend from the first fold in substantially parallel orientations. Edges 62, 64 of the single panel of filter media may be joined together along the side portions 44, 46 of the periphery in any suitable manner, such as, for example, by being sewn together using a filament or thread, being bonded using an adhesive, or being fused or welded using heat and/or pressure. The single panel of filter media may be folded at a second fold 66 located at the opening end portion 40 of the periphery, and typically opposite of the first fold 60, to form the minor pocket 50.

In illustrative embodiments, the material forming portions of the filter media envelope 30 may be of the type that has pores sized to permit air to relatively easily pass through the media without permitting particles the size of common household dust to pass through the material. The material of the filter media envelope 30 may exhibit a degree of resilient stretchability from the unstretched state, and the stretchability characteristic may permit the material to be stretched using hand or finger applied force to the material. The material may be formed of a single layer, or may be formed of multiple layers of varying density of woven or felted filaments or fibers. Optionally, the material may be pleated. In an illustrative embodiment, the filter media may be composed or formed of "polyester 3D spacer mesh,", item no. 200029 available from TVF, Inc. of Carmel, Indiana, USA.

In use, assembly of the filter assembly 10 may be accomplished simply by suitably orienting the support frame 12 with respect to the filter media envelope 30 by placing an end segment or side segment of the perimeter of the frame adjacent to the opening 36 of the media envelope, and inserting the frame into the interior 34 of the envelope through the opening until the frame is entirely, or substantially entirely, positioned in the major pocket 48 of the envelope. A section of the support frame 12, such as the tuck section 20, which is positioned adjacent to the opening 36 of the envelope, may then be tucked into the minor pocket 50 through manipulation of the filter media forming the minor pocket, such as by stretching of the filter media to a degree to move the elements of the support frame forming the tuck section into the minor pocket. Removal of the filter media envelope 30 from the support frame 12 for cleaning or replacement may be accomplished by reversing the aforementioned steps, such as by removing or untucking the tuck section 20 of the frame 12 from the minor pocket 50 as an initial action, and then once the frame section is removed from the minor pocket, removing the frame 12 from the interior of the major pocket 48 through the opening 36.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A reusable filter assembly comprising:

a support frame; and a filter media envelope removably positionable on the support frame, the filter media envelope defining an interior and having an opening into the interior and through which the support frame is insertable into and removable from the interior;

wherein the filter media envelope forms a major pocket for removably receiving a major portion of the support frame and a minor pocket for receiving a minor portion of the support frame when the support frame is positioned in the interior of the filter media envelope;

wherein the minor pocket is oriented in opposition to the major pocket such that portions of the frame are positionable in the major and minor pockets simultaneously.

2. The assembly of claim 1 wherein the frame is secured between the major and minor pockets when the portions of the frame are positioned in the major and minor pockets.

3. The assembly of claim 1 wherein the minor pocket is located at least partially in the major pocket.

4. The assembly of claim 1 wherein the minor pocket is located substantially entirely in the major pocket.

5. The assembly of claim 1 wherein the minor pocket is located at the opening of the filter media envelope.

6. The assembly of claim 1 wherein the major and minor pockets have lengths measured in a direction perpendicular to the opening of the filter media envelope, and a magnitude of the length of the major pocket is at least twice a magnitude of the length of the minor pocket.

7. The assembly of claim 1 wherein the filter media envelope comprises a single panel of filter media having a first fold positioned between a first broad extent of the panel and a second broad extent of the panel to form the major pocket, the material having a second fold positioned between the first broad extent of the panel and a pocket extent of the panel to form the minor pocket.

8. The assembly of claim 7 wherein edges of the single panel of filter media are located on opposite sides of each of the first and second broad extents, the edges being joined together to form the major pocket.

9. The assembly of claim 8 wherein the edges of the single panel are joined together using the application of heat to the panel.

* * * * *